US012750668B2

(12) United States Patent
Deshpande et al.

(10) Patent No.: US 12,750,668 B2
(45) Date of Patent: Sep. 29, 2026

(54) AUTHENTICATOR DEVICE AND METHOD FOR SECURELY IDENTIFYING A VALID DEVICE IN AN OFFLINE WIRELESS ENVIRONMENT

(71) Applicant: Eaton Intelligent Power Limited, Dublin (IE)

(72) Inventors: Rohit Ramchandra Deshpande, Pune (IN); Sonali Sameer Londhe, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 307 days.

(21) Appl. No.: 18/406,572

(22) Filed: Jan. 8, 2024

(65) Prior Publication Data

US 2024/0236673 A1 Jul. 11, 2024

(30) Foreign Application Priority Data

Jan. 10, 2023 (IN) ............................ 202311001945

(51) Int. Cl.

*H04W 12/069* (2021.01)
*H04W 12/0431* (2021.01)
*H04W 56/00* (2009.01)

(52) U.S. Cl.

CPC ..... *H04W 12/069* (2021.01); *H04W 12/0431* (2021.01); *H04W 56/0015* (2013.01)

(58) Field of Classification Search

CPC ........... H04W 12/069; H04W 12/0431; H04W 12/30; H04W 56/0015; H04W 4/021;

(Continued)

(56) References Cited

U.S. PATENT DOCUMENTS

2017/0048215 A1* 2/2017 Straub ................. H04L 63/0823
2017/0257221 A1* 9/2017 Peng ................... H04L 63/0281

(Continued)

FOREIGN PATENT DOCUMENTS

WO 2018080740 A1 5/2018

OTHER PUBLICATIONS

International Search Report and Written Opinion issued in International Application No. PCT/EP2024/025011, mailed Apr. 2, 2024, 12 pages.

*Primary Examiner* — Siu M Lee
(74) *Attorney, Agent, or Firm* — Talem IP Law, LLP

(57) ABSTRACT

An authenticator device is a portable device that includes memory, a communications interface, and a controller. The controller receives authentication information from a cloud network via a communications interface, stores the authentication information in the memory, and authenticates a device utilizing the authentication information when the authenticator device and the device are not connected to the cloud network. A method to authenticate a wireless device in an offline environment is also provided. The method includes connecting the authenticator device to a cloud network, receiving an authentication key and a certificate from the cloud network, storing the authentication key and the certificate in internal memory of the authenticator device, establishing a connection to a mobile device when the authenticator device is not connected to the cloud network, the mobile device including a mobile application that communicates with a remote device, and authenticating the remote device utilizing the authentication key.

20 Claims, 5 Drawing Sheets

(58) Field of Classification Search
CPC ........ H04W 4/33; H04W 84/18; G16Y 30/10; G16Y 40/35; H04L 63/0428; H04L 63/0853; H04L 63/102; H04L 63/108
See application file for complete search history.

(56) References Cited

U.S. PATENT DOCUMENTS

| | | | | |
|---|---|---|---|---|
| 2018/0119975 | A1* | 5/2018 | Park | G06F 21/602 |
| 2019/0089693 | A1* | 3/2019 | Ding | G06F 21/44 |
| 2020/0195632 | A1* | 6/2020 | Yuan | H04L 9/3247 |
| 2021/0203491 | A1 | 7/2021 | Wei et al. | |
| 2021/0258308 | A1 | 8/2021 | Avetisov et al. | |
| 2022/0116227 | A1* | 4/2022 | Choi | G06Q 10/0832 |
| 2023/0131744 | A1* | 4/2023 | Liu | G06F 21/44<br>726/17 |
| 2023/0133680 | A1* | 5/2023 | Yegorov | B60L 53/305<br>320/109 |

* cited by examiner

AUTHENTICATOR DEVICE AND METHOD FOR SECURELY IDENTIFYING A VALID DEVICE IN AN OFFLINE WIRELESS ENVIRONMENT

BACKGROUND

Facilities, such as buildings, may have complex lighting systems that are used to both provide light and to monitor and manage nearby devices. These lighting systems can comprise an array of lighting fixtures, each lighting fixture including sensors and wireless communications technology to relay information, such as sensor information. Additionally, the lighting system may include components such as a mobile device, for example, a mobile phone, that includes a mobile application to control various features of the lighting system.

Lack of cloud connectivity in a network brings in multiple constraints on handling of features such as device authentication. Device authentication involves identifying a remote device, such as a lighting fixture, and verifying that remote device's credentials. Normally, if cloud connectivity is available, then these constraints are overcome easily as all the remote devices have a common server to synchronize with. However, when there is no network connectivity, it is difficult, if not impossible, to authenticate the remote devices.

One method used to authenticate remote devices is public-key cryptography. This method is based on a key pair that includes a public key and a private key. Data that has been encrypted with a public key can be decrypted only with the corresponding private key. Conversely, data that has be encrypted with a private key can be decrypted only with the corresponding public key. A certificate verifies that the entity is the owner of a particular public key.

There is a need to provide a safe method to identify whether or not a remote device is valid. If the needed decryption keys for authentication are stored on the mobile device, there is a possibility that the sensitive key information may be vulnerable to unauthorized users. Otherwise, if the decryption key information is maintained in the cloud, there is a dependency on the network connectivity. Thus, in areas where there is no network connectivity and hence no access to the cloud, it is desired to have an authentication device and corresponding method that can verify the remote device and safely maintain the decryption keys.

BRIEF SUMMARY

An authentication device/method that works in conjunction with a mobile device and can verify the validity of a remote device located in an area where there is no network connectivity is provided. Advantageously, the authenticator device can provide the needed certificates to the remote device so that it knows it is communicating with a valid mobile application on a mobile device.

An authenticator device is a portable device that includes memory, a communications interface, and a controller. The controller receives authentication information from a cloud network via a communications interface, stores the authentication information in the memory, and authenticates a device utilizing the authentication information when the authenticator device and the device are not connected to the cloud network.

A method to authenticate a wireless device in an offline environment includes connecting an authenticator device to a cloud network, receiving an authentication key and a certificate by the authenticator device from the cloud network, storing the authentication key and the certificate in internal memory of the authenticator device, establishing a connection by the authenticator device to a mobile device when the authenticator device is not connected to the cloud network, the mobile device including a mobile application that communicates with a remote device, and authenticating the remote device by the authenticator device via the mobile application utilizing the authentication key.

An authentication system includes an authenticator device including memory and a controller wherein the controller receives an authentication key and a certificate from a cloud network via a communications interface and stores the authentication key and certificate in the memory, a wireless remote device, and a mobile device including a mobile application that communicates with the authenticator device and the wireless remote device. The authenticator device authenticates the wireless remote device via the mobile device when the authenticator device and the wireless remote device are not connected to the cloud network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
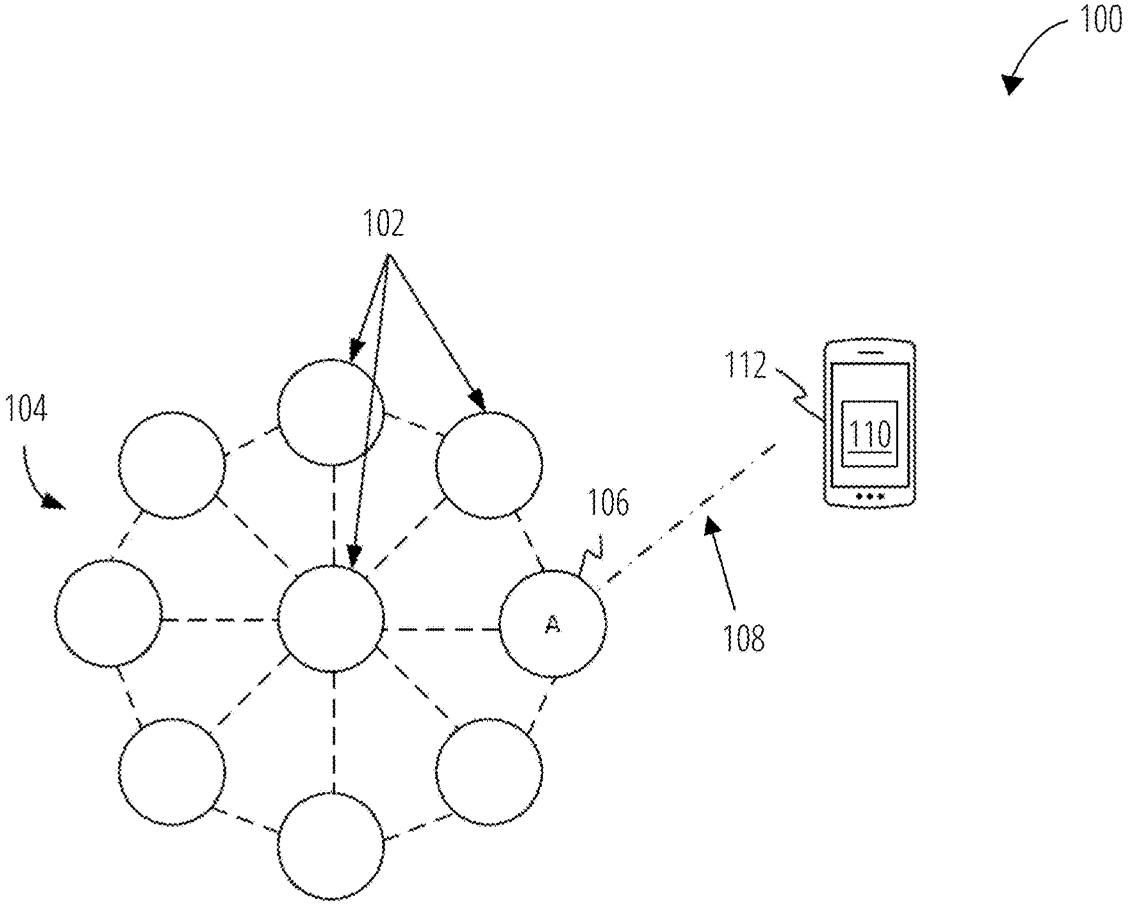
FIG. 1 illustrates a system diagram of an example wireless network.

FIG. 1 illustrates a system diagram of an example wireless network. Referring to FIG. 1, the wireless network 100 includes a plurality of remote devices 102 arranged in a mesh network 104. The plurality of remote devices 102 can communicate with one another. In an embodiment, the mesh network 104 can be a Bluetooth® Low Energy (BLE) network of remote devices 102 that are lighting fixtures. The number of light fixtures in the mesh network 104 can be up to 250 lighting fixtures. While a lighting fixture is mentioned as the remote device, this is for illustrative purposes only. The remote device 102 can be any wireless device that does not have connectivity to a cloud network. For a device that is not part of the mesh network 104, such as a mobile device 112, communication 108 with the mesh network 104 is done via a proxy remote device 106. The proxy remote device 106 may be the remote device closest to the mobile device 112 but can be any of the remote devices 102. The proxy remote device 106 receives information from mobile device 112 and then percolates the information to the other remote devices 102 in the mesh network 104.

The mobile application 110 configures the remote devices 102 (i.e., provisioning) into the mesh network 104 and controls features on the remote devices 102 via a mobile application 110 running on the mobile device 112. In order to ensure that this provisioning operation is done securely, the mobile application 110 and the remote device 102 authenticate one another to make sure that the remote device 102 is a valid device and that the mobile application 110 is valid to communicate with the mesh network 104. When there is cloud connectivity, the mobile application 110 communicates directly with a cloud network in order to conduct this validation via a cryptographic application in the cloud network. However, many times the remote devices 102 are located in areas without cloud connectivity.

Thus, in order to solve this issue, the inventors present an authenticator device that can authenticate both the mobile application 110 and remote device 102 and/or remote devices 102 configured in a wireless mesh network 104 when the mobile application 110 cannot connect to the cloud network.

Figure 2:
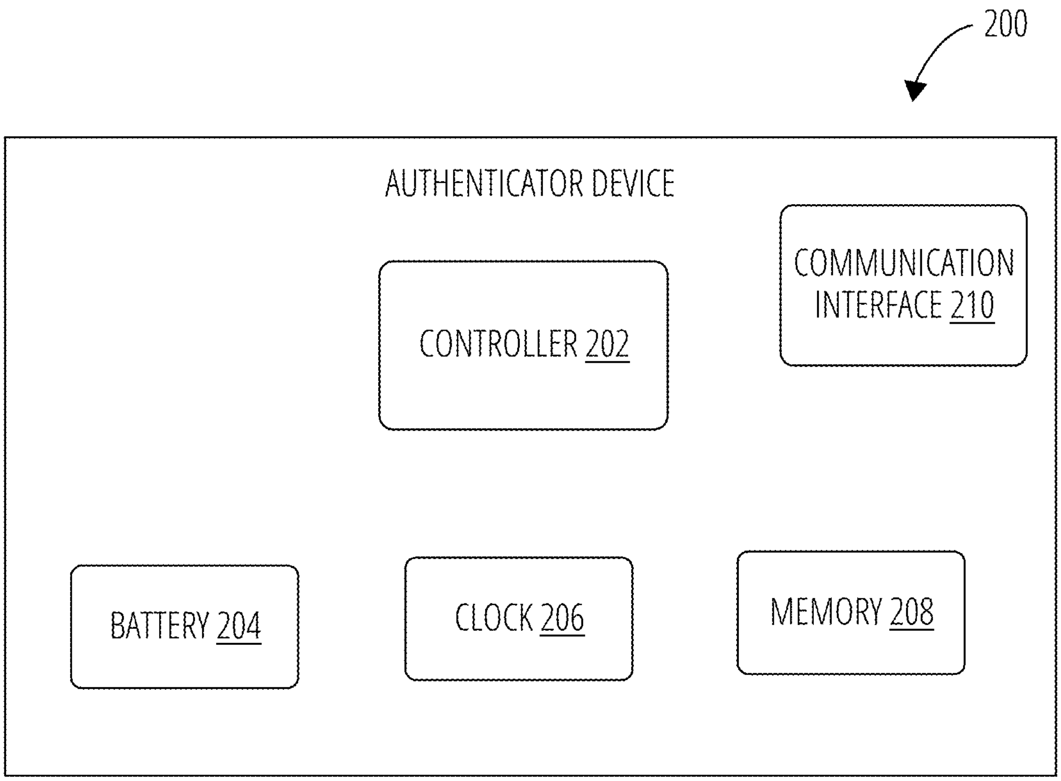
FIG. 2 illustrates components of an authenticator device.

FIG. 2 illustrates components of an authenticator device. The shown authenticator device 200 is an external device including hardware, i.e., an edge device, that may run a Linux based system or an RTOS (real time operating system) system that utilizes a microcontroller. Similar to the mobile application 110, the authenticator device 200 is mobile such that its user can carry it to the site of the wireless network 100. The authenticator device 200 includes internal memory 108 which may be non-volatile memory. The memory 208 can store authentication keys and a certificate to validate the mobile device 112. So that the authenticator device 200 can operate wirelessly, it may include a battery 204. Alternately, the authenticator device 200 is powered by a DC adapter. The authenticator device 200 includes a communication interface 210 to enable communications to a cloud network. For example, the authenticator device 200 may include an ethernet port so that the authenticator device 200 can communicate to the cloud network over Ethernet. Alternatively, the communication interface 210 may be Wi-Fi, or BLE such that the authenticator device 200 would need corresponding ports to support these communications protocols.

A controller 202 on the authenticator device 200 communicates with the cloud network when there is cloud connectivity to receive the authentication keys and the certificate and stores the authentication keys and certificate in the memory 208. Then, when there is no cloud connectivity, the controller 202 can securely identify a valid device (i.e., a remote device 102 or the mobile application 110) in the wireless environment. The authenticator device 200 also includes a real time clock 206 that is synchronized with the current time when the authenticator device 200 is connected to the cloud network.

Figure 3:
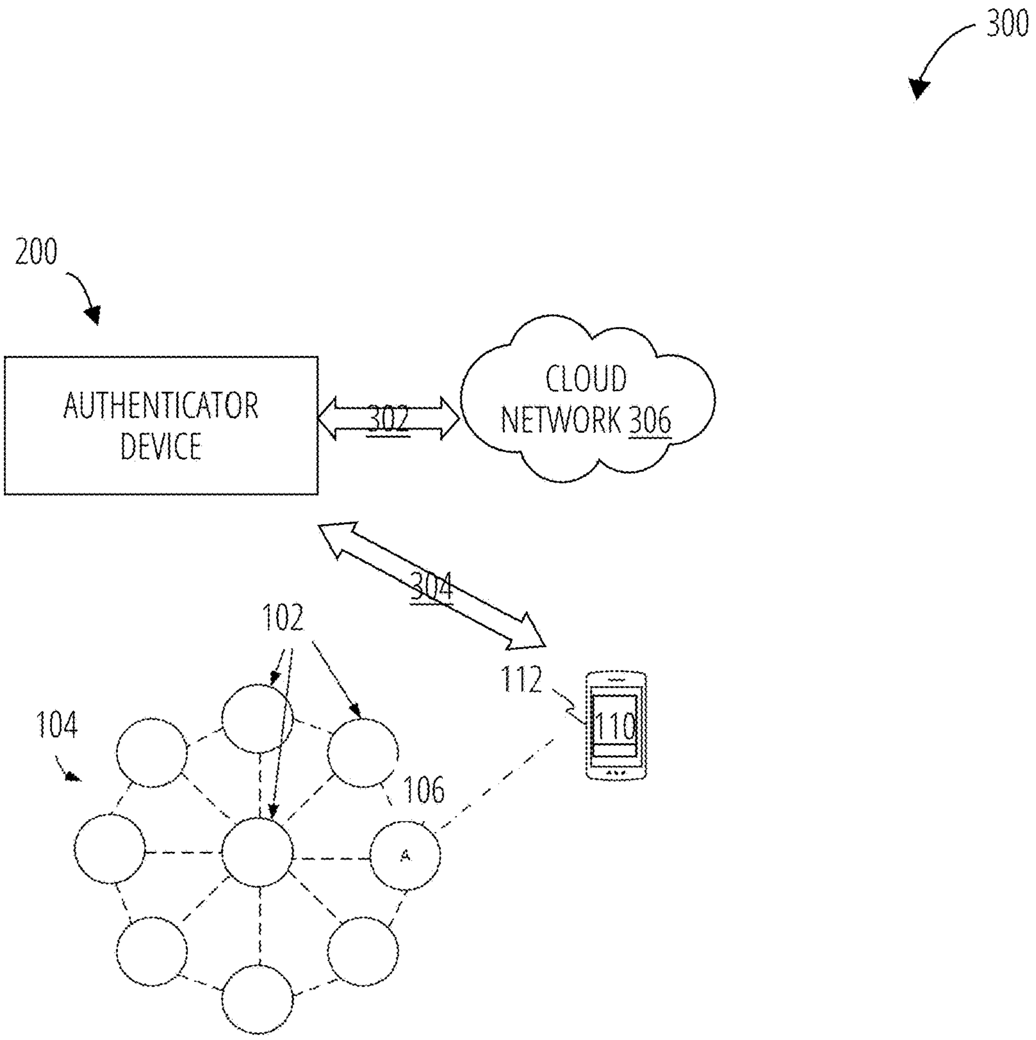
FIG. 3 illustrates a system diagram of an authentication system.

FIG. 3 illustrates a system diagram of an authentication system. The authentication system 300 includes the authenticator device 200, a mesh network 104 of remote devices 102, a mobile application 110, and a cloud network 306. The authenticator device 200 includes the components as described with reference to FIG. 2.

The authenticator device 200 communicates to the cloud network 306 when there is cloud connectivity (i.e., an online mode) via a communications interface 302 that may be ethernet, Wi-Fi, BLE, or any other wired or wireless network protocol which can be used to communicate to remotely, i.e., to the cloud network or a remote server in order to share the needed certificate and authentication keys. In the online mode, the authenticator device 200 will download a set of encrypted authentication keys, for example a public key, private key pair as described above, and the certificate to validate the mobile application 110 installed on the mobile device 112. Alternately, instead of connectivity with the cloud network 306, the authenticator device 200 can connect to an on-premise server having the stored authentication keys and certificate in order to receive the authentication keys and certificate. The authenticator device 200 will then store these authentication keys and the certificate in its memory 208. In addition, the authenticator device 200 can synchronize its real time clock 206 with the current local time during its communications with the cloud network 306 in the online mode.

When there is no cloud connectivity, for example, when the user is at a remote site, the authenticator device 200 may be used in conjunction with the mobile device 112 running the mobile application 110 to authenticate a remote device 102 or remote devices 102 configured in a mesh network 104 in an offline mode. The authenticator device 200 connects to the mobile application 110 using a Wi-Fi connection 304. The mobile application 110 can connect to the mesh network 104 via the BLE 5.0 protocol or other protocol supported by both the mobile application 110 and the remote device 102.

Figure 4:
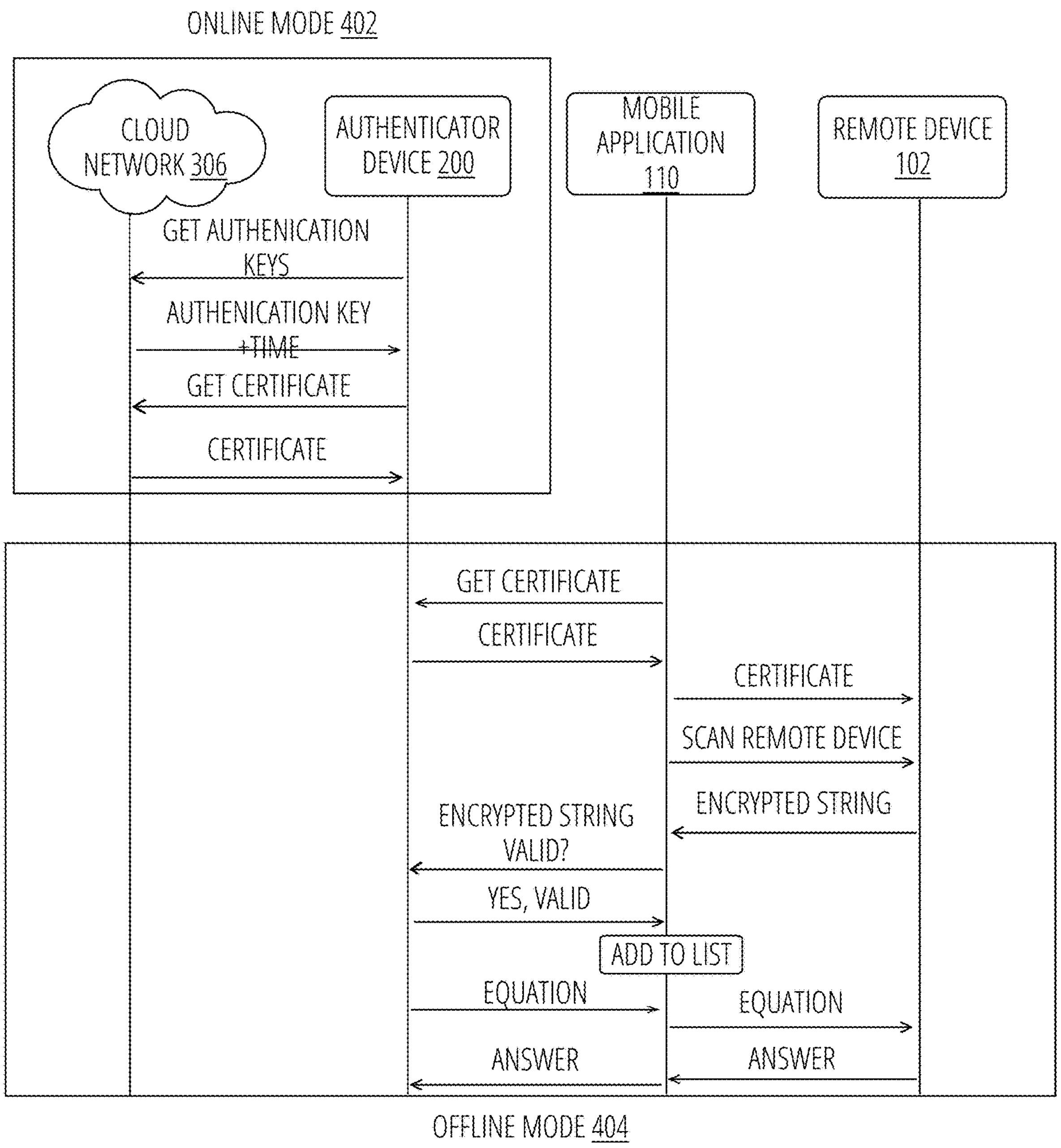
FIG. 4 illustrates a sequence diagram in accordance with an embodiment of the presented method.

FIG. 4 illustrates a sequence diagram of a method to authenticate a device in an offline wireless environment. Initially, the authenticator device 200 connects via the communications interface 302 to the cloud network 306 in an online mode 402. In the online mode 402, once connected, the authenticator device 200 requests and receives the authentication keys and certificate from the cloud network 306. The cloud network 306 encrypts the authentication keys prior to sending them to the authenticator device 200. In addition, the current local time is shared with the authenticator device 200. For security purposes, the authenticator device 200 deletes the authentication keys after a fixed time period. Likewise, the certificate may also be deleted from the authenticator device's internal memory 208 after a fixed time period. In an embodiment, this fixed time period may be seventy-two hours, however, other time periods may also be used.

Once the authentication keys and certificate are received by the authenticator device 200, it is ready to authenticate a remote device 102 in an offline environment without cloud connectivity. The certificate will be used by the remote device 102 to verify that the mobile application 110 on the mobile device 112 is valid. The authentication keys are used by the mobile application 110 to verify that the remote device 102 or mesh network 104 of remote devices is valid.

In the offline mode 404, the authenticator device 200 establishes a Wi-Fi connection 304 with the mobile application 110. The mobile application 110 on the mobile device 112 is then ready to communicate to the authenticator device 200. Once the connection is established to the authenticator device 200, the mobile application 110 will request the certificate which is in an encrypted format that cannot be read or decoded by the mobile application 110. In this way, the certificate should not be able to be accessed by an adversary or corrupted by a virus that may exist on the mobile application 110. The mobile application 110 merely passes the certificate to the remote device 102 that is capable of decoding the certificate. The certificate is not stored in the mobile application. In addition, in the offline mode 404, the local time from the real time clock 206 may be shared with the remote device 102 to synchronize the remote device 102 to the local time and/or to the remote server.

In order to authenticate the remote device 102, the mobile application 110 scans the remote device 102 for an encrypted string. The encrypted string is sent to the mobile application 110 in a response. The mobile application 110 passes the encrypted string to the authenticator device 200 where it is decrypted using the authentication key. From the decryption, the authenticator device 200 can determine whether or not the remote device 102 is a valid remote device. If it is a valid device, the remote device 102 is authenticated and the remote device 102 is displayed in a list of valid remote devices on the mobile application 110. In a configuration of the mesh network 104 by the mobile application 110, the remote device 102 can be added to the mesh network 104. If the authenticator device 200 determines the remote device 102 is not a valid device, a negative acknowledgement will be sent back to the mobile application 110 and the remote device 102 will not be displayed in the list on the mobile application.

The certificate is used to authenticate the mobile application 110. Firmware of the remote device 102 includes a decryption algorithm that it applies to the certificate to determine if the mobile device 112 is a valid mobile device. The remote device 102 does not communicate with the mobile application 110 until the certificate is validated.

Once both the mobile application 110 and the remote device 102 are validated, the list of authenticated remote devices 102 will be transmitted to the authenticator device 200 where it will be stored in the internal memory 208 until cloud connectivity is restored. At this time, the cloud network 306 will be synchronized with the authenticator device 200 and receive the list of authenticated and configured remote devices 102.

If during communication between the mobile application 110 and the remote device 102, the communication is terminated, when communication is reestablished, the remote device 102 will request the certificate from the mobile application again in order to reverify that the mobile application 110 is valid.

In an embodiment, another layer of encryption may be utilized to prevent a malicious device from accessing the encrypted string from the mobile application 110 by imitating a valid remote device. After receiving the encrypted string from the mobile application 110, the authenticator device 200 may then send a random encrypted equation back to the remote device 102 via the mobile application 110. The random encrypted equation may be received from the cloud network 306 when the authenticator device 200 is in the online mode 402. The remote device 102 decodes the encrypted equation, solves the equation, encrypts the answer to the equation, and sends the encrypted answer back to the authenticator device 200 via the mobile application 110. The equation may change randomly. The random equation may be deleted from the authenticator device's internal memory 208 after a fixed time period. Similarly, to the certificate and the encrypted string, the fixed time period may be seventy-two hours, however, other time periods may also be used.

Figure 5:
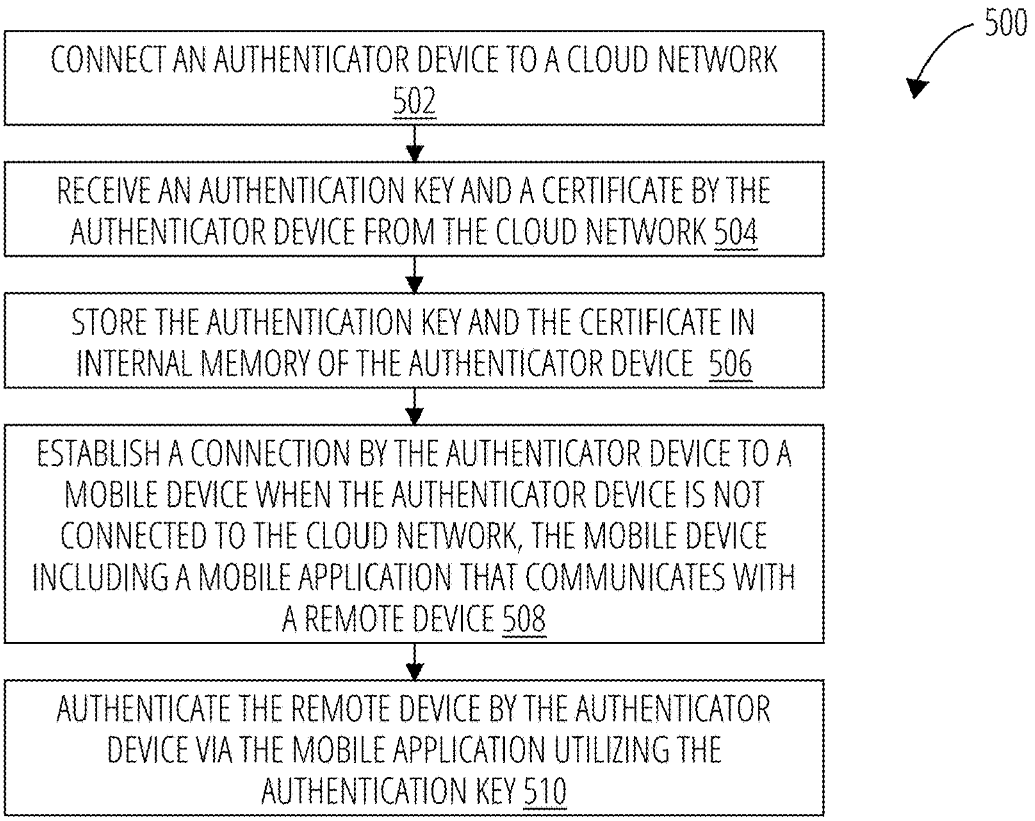
FIG. 5 illustrates a process flow of the method in accordance with one embodiment.

FIG. 5 illustrates a process flow for authentication of a wireless device in an offline environment. Referring to FIG. 5, method 500 connects (502) an authenticator device to a cloud network. Method 500 further receives (504) an authentication key and a certificate by the authenticator device from the cloud network. Method 500 further stores (506) the authentication key and the certificate in internal memory of the authenticator device. Method 500 further establishes (508) a connection by the authenticator device to a mobile device when the authenticator device is not connected to the cloud network, the mobile device including a mobile application that communicates with a remote device. Method 500 further authenticates (510) the remote device by the authenticator device via the mobile application utilizing the authentication key.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. An authenticator device, comprising:
a memory; and
a controller that:
receives authentication information, comprising a certificate and an authorization key, from a cloud network via a communications interface,
stores the authentication information in the memory, and
when the authenticator device and a device comprising an application installed on the device are not connected to the cloud network, the authenticator device:
provides the certificate to the device, wherein the certificate is in an encrypted format that cannot be read or decoded by the installed application, wherein the certificate is utilized by the device to verify the installed application is valid, wherein the device does not communicate with the installed application during an authorization process for a mesh network until the certificate is validated;
after the certificate is validated, receives an encrypted string; and
decrypts the encrypted string using the authentication key to determine whether the device is valid, wherein a valid determination by the authenticator device permits the installed application to communicate with the mesh network.

2. The authenticator device of claim 1, further comprising a real time clock that is synchronized to local time when the authenticator device is connected to the cloud network via the communications interface.

3. The authenticator device of claim 1, wherein the mesh network comprises remote devices configured to participate in the mesh network after receiving proper authorization.

4. The authenticator device of claim 3, wherein the remote devices are a plurality of wireless lighting fixtures.

5. The authenticator device of claim 1, wherein the device is a mobile device, and wherein the application is a mobile application installed on the mobile device, wherein said mobile application is permitted to communicate with the mesh network when properly authorized by the authenticator device.

6. A method to authenticate a wireless device in an offline environment, the method comprising:
connecting an authenticator device to a cloud network;
receiving an authentication key and a certificate by the authenticator device from the cloud network;
storing the authentication key and the certificate in an internal memory of the authenticator device;
establishing a connection by the authenticator device to a mobile device when the authenticator device is not connected to the cloud network, the mobile device including a mobile application that communicates with a remote device; and authenticating the remote device by the authenticator device via the mobile application utilizing the authentication key.

7. The method of claim 6, wherein authenticating the remote device includes:
establishing, by the mobile application, communication with the remote device;
receiving, by the mobile application, an encrypted string from the remote device;
passing, by the mobile application, the encrypted string to the authenticator device;
decrypting, by the authenticator device, the encrypted string utilizing the authentication key;
responsive to a valid encrypted string, authenticating the remote device.

8. The method of claim 7, further comprising authenticating the mobile application by:
receiving the certificate by the remote device from the authenticator device via the mobile device;
decoding the certificate by the remote device utilizing an algorithm; and
responsive to the certificate being valid, the mobile application is authenticated.

9. The method of claim 8, wherein when the mobile application and the remote device are authenticated, the remote device is added to a list in the mobile application as an authenticated remote device.

10. The method of claim 9, further comprising configuring, by the mobile application, a mesh network of remote devices including the authenticated remote device.

11. The method of claim 9, further comprising transmitting the list from the mobile application to the authenticator device, storing the list, by the authenticator device, in the internal memory, and when the authenticator device is connected to the cloud network, transmitting the list to the cloud network.

12. The method of claim 6, further comprising:
deleting the authentication key and the certificate by the authenticator device from the internal memory after a fixed time period.

13. The method of claim 12, wherein the fixed time period is seventy-two hours.

14. The method of claim 12, further comprising synchronizing a real time clock on the authenticator device with current time when the authenticator device is connected to the cloud network.

15. An authentication system, comprising:
an authenticator device including memory and a controller wherein the controller receives an authentication key and a certificate from a cloud network via a communications interface, and stores the authentication key and the certificate in the memory,
a mesh node device configured to participate in a mesh network; and
a mobile device including a mobile application that communicates with the authenticator device and the mesh node wireless remote-device,
wherein when the authenticator device is not connected to the cloud network:
the mobile application attempts to communicate with the mesh network to effectuate changes to the mesh node device; and
wherein the authenticator device authenticates the mobile application using the authentication key and the certificate to permit the mobile application to communicate with the mesh network.

16. The authentication system of claim 15, wherein authentication includes:
providing, by the authenticator device, the certificate to the mobile application for transmission to the mesh node device to permit the mesh node device to verify that the mobile application is valid; and
receiving, by the authenticator device, an encrypted string generated by the mesh node device and decrypting the encrypted string using the authentication key to determine whether the mesh node device is valid.

17. The authentication system of claim 15, wherein authentication includes:
providing, by the authenticator device, the certificate to the mobile device for transmission to the mesh node device, the certificate being in an encrypted format that cannot be read or decoded by the mobile application;
verifying, by the mesh node device, that the mobile application is valid based on the certificate, wherein the mesh node device does not communicate with the mobile application during an authorization process for the mesh network until the certificate is validated; and
receiving, by the authenticator device, an encrypted string generated by the mesh node device and decrypting the encrypted string using the authentication key to determine whether the mesh node device is valid.

18. The authentication system of claim 17, wherein the mesh node device permits communication with the mobile application to effectuate changes within the mesh network only after the mobile application is verified as valid based on the certificate and the mesh node device is determined to be valid based on the decryption of the encrypted string.

19. The authentication system of claim 15, wherein the authenticator device is further configured to provide the certificate to the mesh node device via the mobile device, the certificate being in an encrypted format that cannot be read or decoded by the mobile application, wherein the mesh node device verifies that the mobile application is valid based on the certificate and does not communicate with the mobile application during an authorization process for the mesh network until the certificate is validated, and wherein after the certificate is validated the authenticator device receives an encrypted string generated by the mesh node device and decrypts the encrypted string using the authentication key to determine whether the mesh node device is valid.

20. The authentication system of claim 15, wherein the authenticator device is configured to connect to the cloud network to receive the authentication key and the certificate and store the authentication key and the certificate in the memory, and wherein when the authenticator device is not connected to the cloud network the authenticator device establishes communication with the mobile device and authenticates the mesh node device via the mobile application using the authentication key.

* * * * *